United States Patent
Park et al.

(10) Patent No.: US 9,514,712 B2
(45) Date of Patent: Dec. 6, 2016

(54) DISPLAY DEVICE AND DRIVING METHOD THEREOF USING TIMING CONTROLLERS THAT CONTROL IMAGE DATA BEING APPLIED TO ADJACENT BLOCKS OF PIXELS

(71) Applicant: SAMSUNG DISPLAY CO., LTD., Yongin-si, Gyeonggi-do (KR)

(72) Inventors: Dong-Won Park, Gyeonggi-do (KR); Nam-Gon Choi, Asan-si (KR); Geunjeong Park, Daegu (KR); Taehyeong An, Gyeonggi-do (KR); Donggyu Lee, Seoul (KR); Yongjun Jang, Yongin-si (KR); Ji-woong Jeong, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 297 days.

(21) Appl. No.: 13/904,482

(22) Filed: May 29, 2013

(65) Prior Publication Data

US 2014/0204065 A1    Jul. 24, 2014

(30) Foreign Application Priority Data

Dec. 18, 2012   (KR) ........................ 10-2012-0148740

(51) Int. Cl.
*G09G 3/36* (2006.01)
*G09G 5/18* (2006.01)
(Continued)

(52) U.S. Cl.
CPC .............. *G09G 5/18* (2013.01); *G09G 3/2033* (2013.01); *G09G 5/006* (2013.01); *G06F 3/1446* (2013.01);
(Continued)

(58) Field of Classification Search
CPC .. G09G 3/2092; G09G 3/3688; G09G 3/3685; G09G 2310/0264; G09G 2370/08; G09G 5/18; G09G 5/006
USPC ......................................................... 345/204
See application file for complete search history.

(56) References Cited

U.S. PATENT DOCUMENTS 6,151,036 A * 11/2000 Nakajima .............. H04N 5/907
345/538
6,587,089 B1    7/2003 Nakajima
(Continued)

FOREIGN PATENT DOCUMENTS

KR    1020100130086    12/2010

*Primary Examiner* — Jonathan Blancha
(74) *Attorney, Agent, or Firm* — F. Chau & Associates, LLC (57) ABSTRACT

A display device includes a display panel, a first timing controller, and a second timing controller. The display panel includes a first block and a second block adjacent to the first block, with a data line positioned between the first block and the second block. The first block includes a first column of pixels, and the second block includes a second column of pixels. The first and second columns of pixels are alternately connected to the data line. The first timing controller is configured to receive first image data corresponding to the first block. A second timing controller is configured to receive second image data corresponding to the second block. The first timing controller is configured to transfer at least part of the first mage data to the second timing controller.

20 Claims, 8 Drawing Sheets

(51) Int. Cl.
  *G09G 5/00* (2006.01)
  *G09G 3/20* (2006.01)
  *G06F 3/14* (2006.01)
(52) U.S. Cl.
  CPC .............. *G09G 2310/0221* (2013.01); *G09G 2310/0281* (2013.01); *G09G 2370/08* (2013.01)

(56) References Cited

U.S. PATENT DOCUMENTS

| | | |
|---|---|---|
| 6,657,622 B2 | 12/2003 | Park |
| 7,123,252 B1 | 10/2006 | Baek |
| 7,940,242 B2 | 5/2011 | Lin |
| 7,990,357 B2 | 8/2011 | Shin |
| 2004/0119670 A1* | 6/2004 | Rivera-Cintron ...... G09G 5/395 345/87 |
| 2006/0044249 A1 | 3/2006 | Lee et al. |
| 2006/0197716 A1 | 9/2006 | Tanaka et al. |
| 2009/0322661 A1* | 12/2009 | Bae ..................... G09G 3/3648 345/87 |
| 2010/0225637 A1 | 9/2010 | Jeon et al. |
| 2010/0302214 A1 | 12/2010 | Kim et al. |
| 2011/0116218 A1* | 5/2011 | Choi ....................... H04N 5/64 361/679.01 |
| 2011/0134168 A1 | 6/2011 | Yeo et al. |
| 2011/0221727 A1* | 9/2011 | Kim ..................... G09G 3/3614 345/209 |
| 2011/0248966 A1 | 10/2011 | Ahn et al. |
| 2012/0154454 A1 | 6/2012 | Ohishi |

\* cited by examiner

DISPLAY DEVICE AND DRIVING METHOD THEREOF USING TIMING CONTROLLERS THAT CONTROL IMAGE DATA BEING APPLIED TO ADJACENT BLOCKS OF PIXELS

CROSS-REFERENCE TO RELATED APPLICATIONS

This U.S. non-provisional application claims priority under 35 U.S.C. §119 to Korean Patent Application No. 10-2012-0148740 filed Dec. 18, 2012, in the Korean Intellectual Property Office, the disclosure of which are incorporated by reference herein in its entirety.

TECHNICAL FIELD

The inventive concepts described herein relate to a display device and a driving method thereof, and more particularly, relate to a display device including a plurality of timing controllers and a driving method thereof.

DISCUSSION OF THE RELATED ART

A display panel includes data lines, gate lines, and pixels. The pixels may be alternately connected with adjacent data lines for inversion driving.

High-resolution displays, such as full HD (1920×1080), ultra HD (3840×260), or quad HD (7680×4320) displays, may be achieved by increasing the number of pixels of the display panel.

Further, demand of high-speed frame driving and large-scaled displays is on the rise.

To respond to such demand, multiple timing controllers drive pixels in their respective corresponding blocks.

When, in such structure, the pixels are alternately connected with adjacent data lines, data loss may occur at a boundary between two adjacent blocks.

SUMMARY

An exemplary embodiment of the inventive concept provides a display device comprising a display panel, a first timing controller, and a second timing controller.

The display panel includes m data lines extending in a first direction, gate lines extending in a second direction, a first block, a second block adjacent to the first block, with a k-th data line positioned between the first block and the second block (k being a natural number more than 1 and less than m), and a plurality of pixels respectively disposed in regions defined by the m data lines and the gate lines. At least one first pixel disposed along the first direction among the plurality of pixels is alternately connected with adjacent data lines adjacent to each other in the second direction among the m data lines every u pixels (u is a natural number). The first timing controller receives first image data corresponding to the first block, and the second timing controller receives second image data corresponding to the second block. At least one of a part of the first image data or a part of the second image data is transferred to the first timing controller or the second timing controller.

The second timing controller comprises a memory which stores the second image data on a per-line data basis. A transfer signal generating unit is included in the second timing controller. The transfer signal generating unit generates a data transfer signal that is pulsed once whenever at least two line data are stored. A data communication unit is included in the second timing controller. The data communication unit performs data communication with the first timing controller based on the data transfer signal. A data alignment unit is included in the second timing controller. The data alignment unit rearranges the line data and a part of the first image data received from the first timing controller.

An exemplary embodiment of the inventive concept provides a method of driving a display device. The method comprises receiving a part of first image data through data communication between adjacent timing controllers, receiving second image data, and rearranging the second image data and the part of the first image data and outputting rearranged data.

BRIEF DESCRIPTION OF THE FIGURES

The above and other features of the inventive concept will become more apparent by describing in detail exemplary embodiments thereof with reference to the accompanying drawings, in which.

DETAILED DESCRIPTION OF THE EMBODIMENTS

Hereinafter, exemplary embodiments of the inventive concept will be described in detail with reference to the accompanying drawings. The inventive concept, however, may be embodied in various different forms, and should not be construed as being limited to the embodiments set forth herein. Like reference numerals may denote like or similar elements throughout the drawings and the specification.

As used herein, the singular forms "a," "an" and "the" may include the plural forms as well, unless the context clearly indicates otherwise.

It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
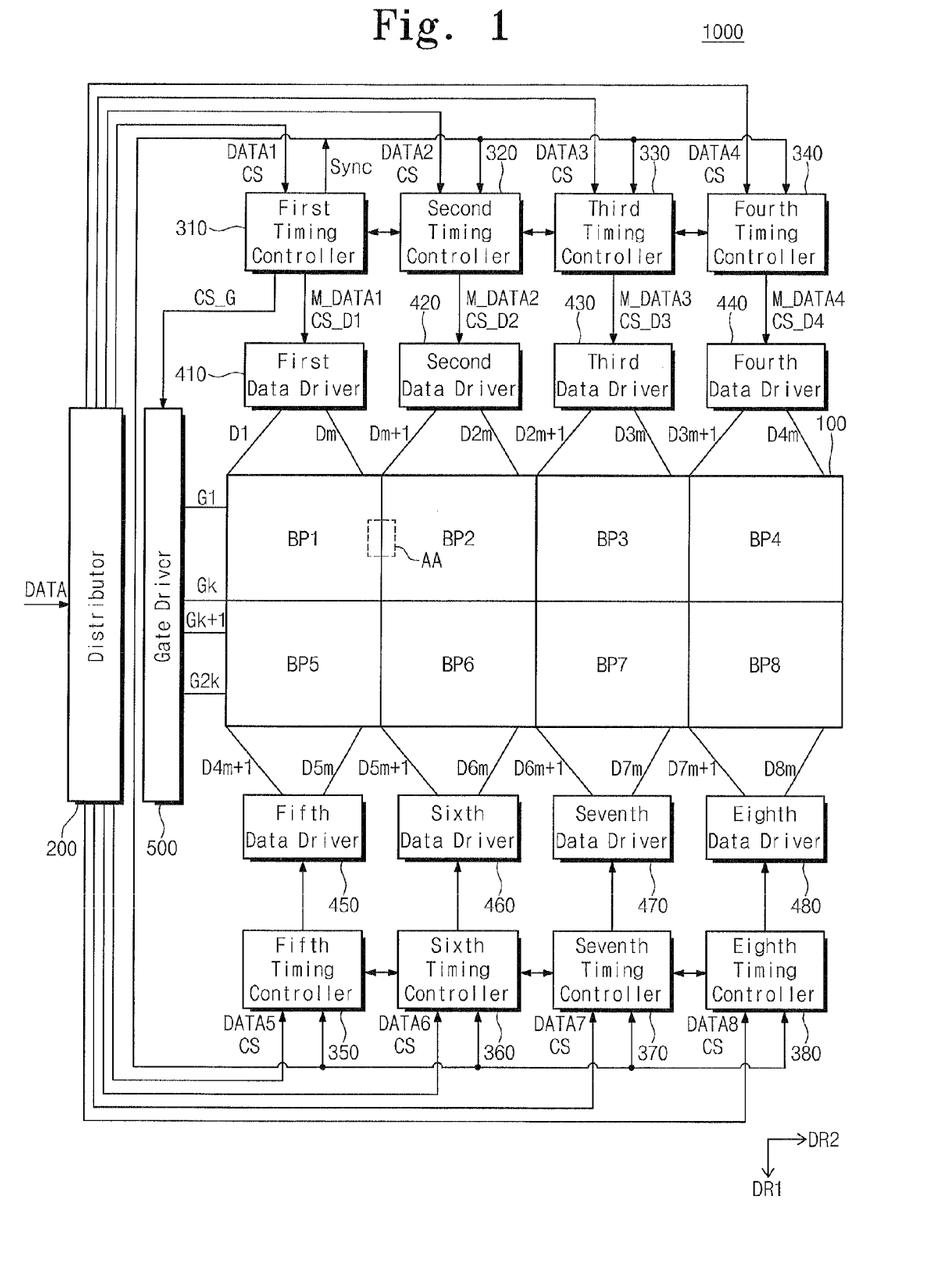
FIG. 1 is a block diagram illustrating a display device according to an exemplary embodiment of the inventive concept.

FIG. 1 is a block diagram illustrating a display device according to an exemplary embodiment of the inventive concept.

Referring to FIG. 1, a display device 1000 may include a display panel 100, a distributor 200, timing controllers 310 to 380, data drivers 410 to 480, and a gate driver 500.

The display panel 100 may display images. The display panel 100 need not be limited to a specific display panel. For example, a liquid crystal display panel, an organic light emitting display panel, an electrophoretic display panel, and an electrowetting display panel may be used as the display panel 100.

The display panel 100 may include a plurality of data lines D1 to D8m (m is a natural number) and a plurality of gate lines G1 to G2k (k is a natural number). The data lines D1 to D8m receive data voltages. The data lines D1 to D8m may be extended in a first direction DR1. The gate lines G1 to G2k receive gate signals. The gate lines G1 to G2k may be extended in a second direction DR2. The gate lines G1 to G2k and the data lines D1 to D8m may be isolated from one another, and may be arranged to cross each other.

A plurality of pixel regions may be defined by the gate lines G1 to G2k and the data lines D1 to D8m. A plurality of pixels may be formed in the plurality of pixel regions, respectively.

The display panel 100 may be divided into a plurality of, for example, first to eighth blocks BP1 to BP8. As shown in FIG. 1, the display panel 100 is divided into first to eighth blocks BP1 to BP8 forming a 4×2 matrix. Boundaries of the first to eighth blocks BP1 to BP8 may be defined by a (m+1)-th data line Dm+1, a (2m+1)-th data line D2m+1, a (3m+1)-th data line D3m+1, and a k-th gate line Gk. Each of the first to eighth blocks BP1 to BP8 may include (m×k) pixels.

The distributor 200 may distribute image data input from an external device to the first to eighth timing controllers 310 to 380. The distributor 200 may divide the image data into first to eighth image data DATA1 to DATA8 respectively corresponding to the first to eighth blocks BP1 to BP8 and may distribute the first to eighth image data DATA1 to DATA8 to the first to eighth timing controllers 310 to 380, respectively. The number of the timing controllers 310 to 380 may be equal to the number of the blocks BP1 to BP8.

The first to eighth timing controllers 310 to 380 may be classified into a master timing controller and slave timing controllers for synchronization therebetween. For example, the first timing controller 310 may operate as a master timing controller, and each of the second to eighth timing controllers 320 to 380 may operate as a slave timing controller. The first timing controller 310 may be connected with the second to eighth timing controllers 320 to 380 and may provide a synchronization signal Sync to the second to eighth timing controllers 320 to 380.

The first to eighth timing controllers 310 to 380 may generate data control signals CS_D1 to CS_D8 in response to corresponding control signals CS. The first to eighth timing controllers 310 to 380 may provide the generate data control signals CS_D1 to CS_D8 to the first to eighth data drivers 410 to 480, respectively.

The first timing controller 310 may generate a gate control signal CS_G based on the control signal CS and may provide the gate control signal CS_G to the gate driver 500. However, the inventive concept is not limited thereto. For example, the gate control signal CS_G can be provided to the gate driver 500 from the second to eighth timing controllers 320 to 380 or from the distributor 200.

Each of the data control signals CS_D1 to CS_D8 may include a horizontal start signal for starting an operation of a corresponding data driver, a polarity inversion signal for controlling a polarity of corresponding data, and a load signal for determining a point of time when a data voltage is output from a corresponding data driver.

The gate control signal CS_G may include a vertical start signal for starting an operation of the gate driver 500, and a gate clock signal for determining a point of time when a gate signal is output.

Of the first to eighth timing controllers 310 to 380, timing controllers adjacent to each other in the second direction DR2 perform data communication therebetween. For example, the first and second timing controllers 310 and 320 may perform data communication therebetween, the second and third timing controllers 320 and 330 may perform data communication therebetween, and the third and fourth timing controllers 330 and 340 may perform data communication therebetween.

The fifth and sixth timing controllers 350 and 360 may perform data communication therebetween, the sixth and seventh timing controllers 360 and 370 may perform data communication therebetween, and the seventh and eighth timing controllers 370 and 380 may perform data communication therebetween.

The first timing controller 310 may generate first modulation data M_DATA1 based on the first image data DATA1 and based on data communication with the second timing controller 320. Likewise, the second to eighth timing controllers 320 to 380 may generate second to eighth modulation data M_DATA2 to M_DATA8, respectively. The first to eighth timing controllers 310 to 380 may transfer the first to eighth modulation data M_DATA1 to M_DATA8 to the first to eighth data drivers 410 to 480, respectively.

The first to eighth data drivers 410 to 480 may correspond to the first to eighth timing controllers 310 to 380, respectively. The first to eighth timing controllers 310 to 380 may convert the first to eighth modulation data M_DATA1 to M_DATA8 into analog data voltages, respectively. The analog data voltages may be provided to the first to eighth blocks BP1 to BP8 from the first to eighth timing controllers 310 to 380, respectively.

The first data driver 410 may be connected with the data lines D1 to Dm and may provide a data voltage corresponding to the first modulation data M_DATA1 to (m×k) pixels of the first block BP1. Likewise, the second data driver 420 may be connected with the data lines Dm+1 to D2m and may provide a data voltage corresponding to the second modulation data M_DATA2 to (m×k) pixels of the second block BP2. The same or substantially the same manner may apply to the third to eighth data drivers 430 to 480.

As shown in FIG. 1, as an example, the first to eighth timing controllers 310 to 380 and the first to eighth data drivers 410 to 480 are connected in a one-to-one correspondence. In other words, the first to eighth timing controllers 310 to 380 are connected to the first to eighth data drivers 410 to 480, respectively. However, the inventive concept is not limited thereto. For example, each of the first to eighth timing controllers 310 to 380 may be connected with a plurality of data drivers. As shown in FIG. 1, when viewed at the plan view, the data drivers 410 to 440 are disposed at an upper side of the display panel 100, and the data drivers 450 to 480 are disposed at a lower side of the display panel 100. However, the inventive concept is not limited thereto. For example, when the display panel 100 is separated into blocks disposed only in the second direction DR2, the data drivers all may be disposed at one of upper and lower sides of the display panel 100.

The gate driver 500 may generate a gate signal for driving the gate lines G1 to G2k based on the gate control signal CS_G and may provide the gate signal to the gate lines G1 to G2k.

The gate lines G1 to G2k may be divided into upper gate lines G1 to Gk and lower gate lines Gk+1 to G2k. The upper gate lines G1 to Gk and lower gate lines Gk+1 to G2k may sequentially receive gate signals. The gate signals may be substantially simultaneously applied to the upper gate lines G1 to Gk and lower gate lines Gk+1 to G2k, respectively. For example, some gate signals may be substantially simultaneously applied to the first and 2k-th gate lines G1 and G2k, respectively, and other gate signals may be substantially simultaneously applied to the k-th and (k−1)-th gate lines Gk and Gk+1, respectively.

FIG. 1 illustrates one gate driver 500. However, the inventive concept is not limited thereto. For example, a plurality of gate drivers can be provided. When a plurality of gate drivers are provided, one of the gate drivers may be provided at a left side of the display panel 100, and another one of the gate drivers may be provided at a right side of the display panel 100. When two gate drivers are disposed at left and right sides of the display panel 100, respectively, one of the two gate drivers may apply gate signals to odd-numbered gate lines of the gate lines G1 to G2k, and the other may apply gate signals to even-numbered gate lines of the gate lines G1 to G2k.

Figure 2:
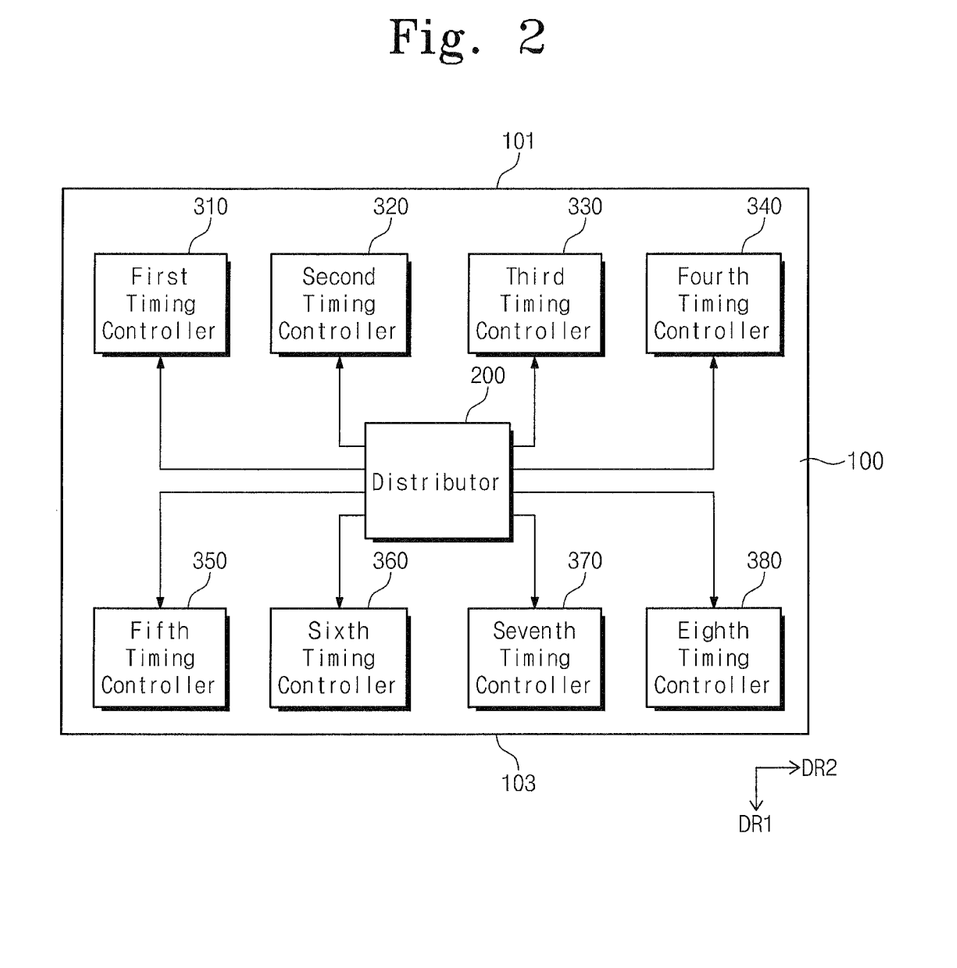
FIG. 2 is a block diagram illustrating a display panel according to an exemplary embodiment of the inventive concept.

FIG. 2 is a block diagram illustrating a display panel according to an exemplary embodiment of the inventive concept.

Referring to FIG. 2, a display panel 100 may be substantially rectangular in a plan view.

A distributor 200 may be disposed substantially at a center of the back of the display panel.

First to eighth timing controllers 310 to 380 may be formed on the back of the display panel 100 and may be connected to the distributor 200.

The first to eighth timing controllers 310 to 380 may be disposed along two opposite sides of the display panel 100 which are parallel with each other in a second direction DR2. The first to fourth timing controllers 310 to 340 may be spaced apart from each other and may be disposed along an upper side 101 of the display panel 100. The fifth to eighth timing controllers 350 to 380 may be spaced apart from each other and may be disposed along a lower side 103 of the display panel 100.

Figure 3:
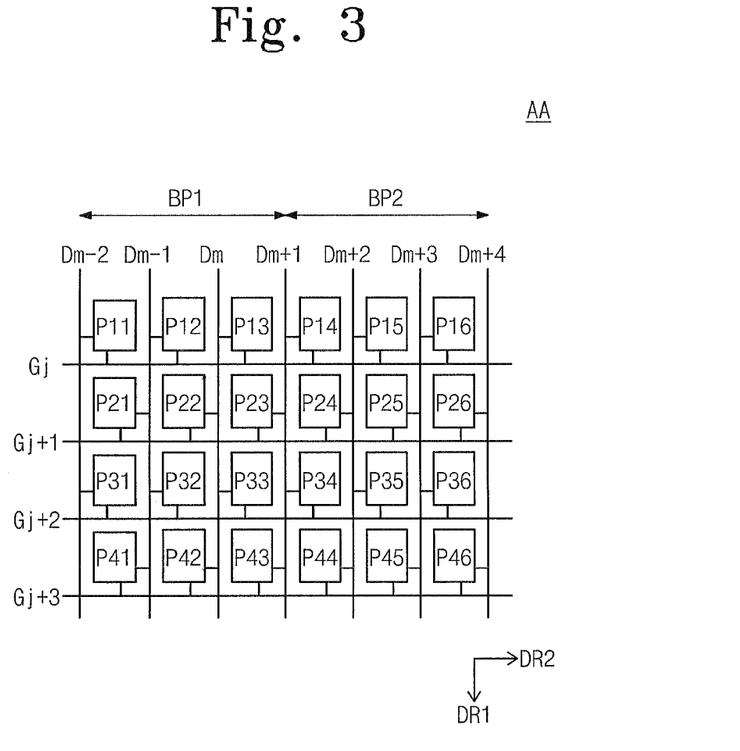
FIG. 3 is an expanded view of a portion AA in FIG. 1, according to an exemplary embodiment of the inventive concept.

FIG. 3 is an expanded view illustrating a portion AA in FIG. 1.

The portion AA in FIG. 1 may be a part of the display panel 100 and may include part of a first block BP1, part of a second block BP2, and a boundary between the part of the first block BP1 and the part of the second block BP2. However, the inventive concept is not limited thereto. For example, the portion AA can include part of the second block BP2, part of a third block BP3, and a boundary between the part of the second block BP2 and the part of the third block BP3.

As shown in FIG. 3, seven data lines Dm−2 to Dm+4 and four gate lines Gj to Gj+3 (j is a natural number less than k−3) are provided. 6×4 pixels P11 to P46 are illustrated in FIG. 3, which are provided in regions defined by the data lines Dm−2 to Dm+4 and the gate lines Gj to Gj+3.

A pixel column may be defined by pixels sharing the same column, and a pixel row may be defined by pixels sharing the same row. For example, a first pixel row may include six pixels P11 to P16 sharing a first row, and a first pixel column may include four pixels P11 to P41 sharing a first column.

The first block BP1 and the second block BP2 may be divided by a (m+1)-th data line Dm+1. Thus, the first block BP1 may include first to third pixel columns including pixels P11 to P41, P12 to P42, and P13 to P43, and the second block BP2 may include fourth to sixth pixel columns including pixels P14 to P44, P15 to P45, and P16 to P46.

The pixels in a pixel column may be alternately connected with adjacent data lines positioned at both sides thereof.

In the third pixel column including pixels P13 to P43, for example, the first row pixel P13 may be connected to the m-th data line Dm, the second row pixel P23 may be connected to the (m+1)-th data line Dm+1, the third row pixel P33 may be connected to the m-th data line Dm, and the fourth row pixel P43 may be connected to the (m+1)-th data line Dm+1.

A first timing controller 310 may receive first image data DATA1 corresponding to the first block BP1, and a second timing controller 320 may receive second image data DATA2 corresponding to the second block BP2. In this case, the pixel P23 in the second row and third column and the pixel P43 in the fourth row and third column may be included in the first block BP1. However, since the pixels P23 and P43 are connected with the (m+1)-th data line Dm+1, to the pixels P23 and P43 are supplied with a data voltage from the second timing controller 320 via a second data driver 420.

However, since the second image data DATA2 does not include image data corresponding to the pixel P23 in the second row and third column and the pixel P43 in the fourth row and third column, data loss may arise.

To address the data loss, timing controllers adjacent to each other in the second direction DR2 may perform data communication therebetween. For example, the first timing controller 310 may provide the second timing controller 320 with image data corresponding to the pixel P23 in the second row and third column and the pixel P43 in the fourth row and third column.

Figure 4:
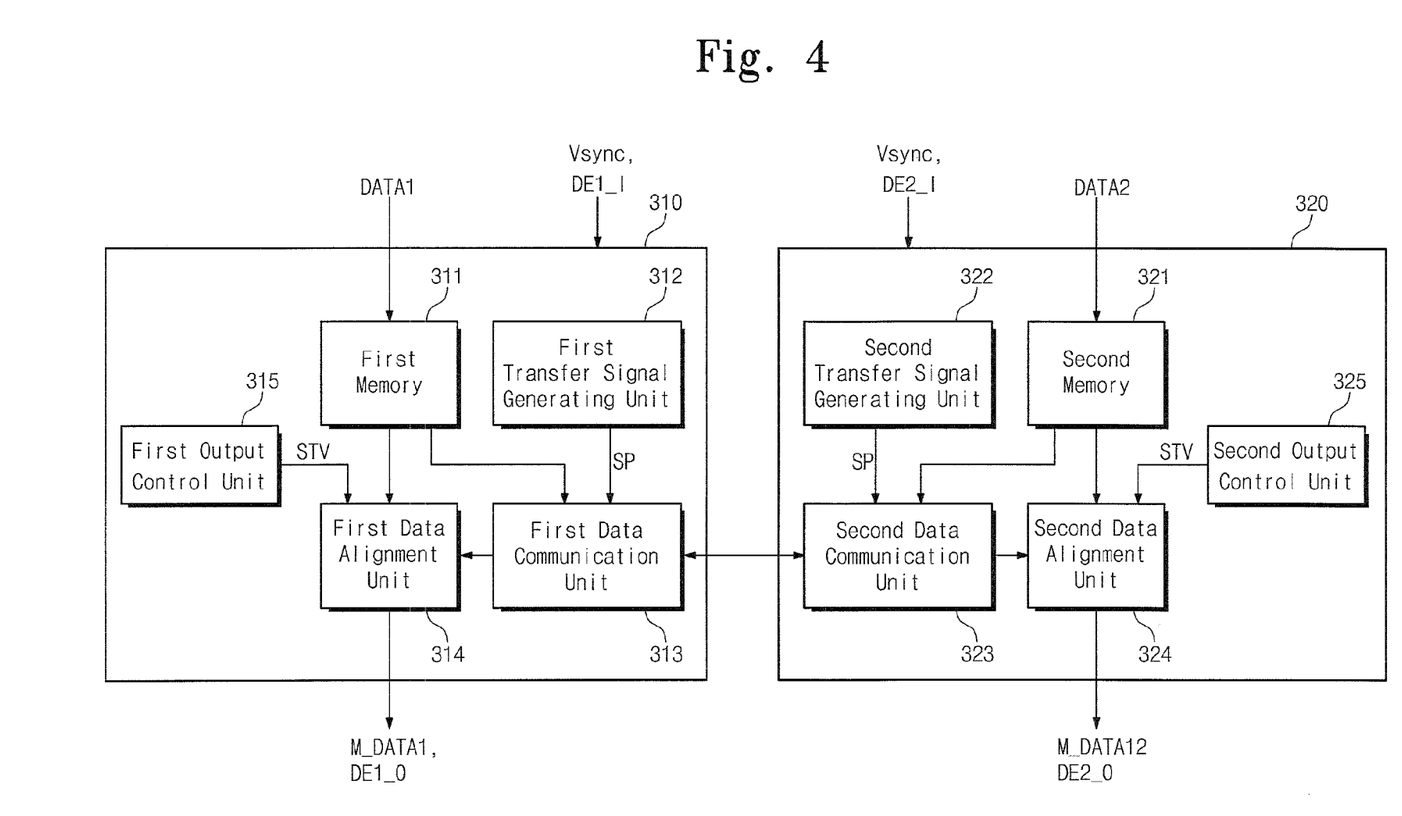
FIG. 4 is a block diagram illustrating first and second timing controllers in FIG. 1, according to an exemplary embodiment of the inventive concept.
Figure 5:
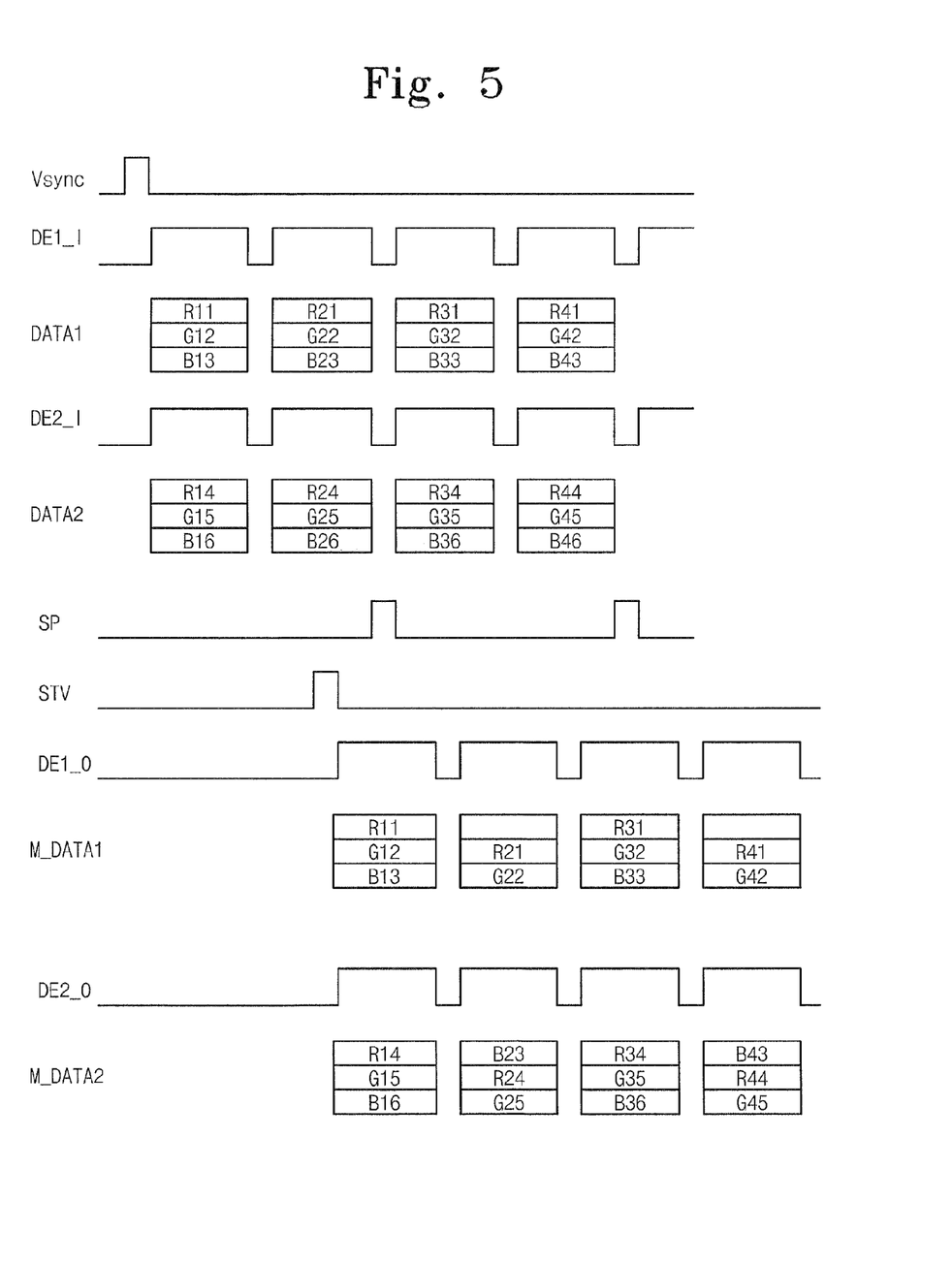
FIG. 5 is a diagram illustrating input and output signals of first and second timing controllers, according to an exemplary embodiment of the inventive concept.

FIG. 4 is a block diagram illustrating first and second timing controllers in FIG. 1. FIG. 5 is a diagram illustrating input and output signals of first and second timing controllers.

Referring to FIGS. 3 to 5, a first timing controller 310 may include a first memory 311, a first transfer signal generating unit 312, a first data communication unit 313, a first data alignment unit 314, and a first output control unit 315.

A second timing controller 320 may include a second memory 321, a second transfer signal generating unit 322, a second data communication unit 323, a second data alignment unit 324, and a second output control unit 325.

The first timing controller 310 may receive a vertical synchronization signal Vsync and a first input enable signal DE1_I. The second timing controller 320 may receive the vertical synchronization signal Vsync and a second input enable signal DE2_I. When the second timing controller 320 operates as a slave controller, the second timing controller 320 may receive one of the first input enable signal DE1_I and second input enable signal DE2_I from the first timing controller 310.

The first timing controller 310 may receive first image data DATA1 on a per-line data basis, and the second timing controller 320 may receive second image data DATA2 on a per-line data basis. Each of the first and second image data DATA1 and DATA2 may include red data R, green data G, and blue data B.

Referring to FIG. 3, for example, first line data of the first image data DATA1 may be data R11, G12, and B13 respectively corresponding to pixels P11, P12 and P13 in a first pixel row of a first block BP1. First line data of the second image data DATA2 may be data R14, G15, and B16 respectively corresponding to pixels P14, P15 and P16 in a first pixel row of a second block BP2. In FIG. 5, "Rx", "Gx", and "Bx" each may be image data corresponding to Px in FIG. 3.

The first memory 311 may store the first image data DATA1 on a per-line data basis in response to the first input enable signal DE1_I.

Each of the first and second transfer signal generating units 312 and 322 may generate a data transfer signal SP. The data transfer signal SP may be a signal for determining a timing when data communication between the first timing controller 310 and the second timing controller 320 is performed. The first and second transfer signal generating units 312 and 322 may provide the data transfer signals SP to the first and second data communication units 313 and 323, respectively.

The data transfer signal SP may be pulsed whenever the first and second timing controllers 310 and 320 receive two line data.

Each of the first and second data communication units 313 and 323 may perform data communication based on the data transfer signal SP. At least one of a part of the first image data DATA1 and/or a part of the second image data DATA2 may be transferred between the first data communication unit 313 and the second data communication unit 323. The first data communication unit 313 may receive a part of the first image data DATA1 from the first memory 311, and the second data communication unit 323 may receive a part of the second image data DATA2 from the second memory 321.

A part of the first image data DATA1 and a part of the second image data DATA2 may include 8 to 12 data bits.

A part of the first image data DATA1 may be image data corresponding to pixels P23 and P43 included in the first block BP1 and connected with an (m+1)-th data line Dm+1.

The first data communication unit 313 may transfer blue data B23 in second line data of the first image data DATA1 to the second data communication unit 323.

The blue data B23 may be included in the first image data DATA1 received by the first timing controller 310. However, a pixel P23 in the second row and third column corresponding to the blue data B23 is connected with the (m+1)-th data line Dm+1 and receives image data from the second timing controller 320.

Likewise, the first data communication unit 313 may transfer blue data B43 in fourth line data of the first image data DATA1 to the second data communication unit 323.

The second data communication unit 323 may provide the second data alignment unit 324 with a part of the first image data DATA1 transferred from the first data communication unit 313.

Since no image data is transferred from the second data communication unit 323, the first data communication unit 313 does not provide data to the first data alignment unit 314. However, the inventive concept is not limited thereto. For example, when image data is transferred from the second data communication unit 323 to the first data communication unit 313, the first data communication unit 313 may provide the transferred image data to the first data alignment unit 314.

The first data communication unit 313 and the second data communication unit 323 may transfer data through a serial communication scheme or a parallel communication scheme. For example, inter-integrated circuit (I2C), active serial (AS), and serial peripheral interface (SPI) communication schemes may be used.

The first output control unit 315 may generate an output control signal STV and may output the output control signal STV to the first data alignment unit 314. The second output control unit 325 may generate an output control signal STV and may output the output control signal STV to the second data alignment unit 324.

The first data alignment unit 314 may generate first modulation data M_DATA1 by outputting and rearranging the first image data DATA1 from the first memory 313 on a per-line data basis.

The first modulation data M_DATA1 may be image data obtained by rearranging the first image data DATA1 considering a data line connected with each pixel.

The first data alignment unit 314 may rearrange line data once whenever two line data are read. For example, the first data alignment unit 314 may generate the first modulation data M_DATA1 by rearranging second line data R21, G22 and B23 without rearranging first line data R11, G12 and G13 of the first image data DATA1.

The first data alignment unit 314 may generate a first output enable signal DE1_O based on the output enable signal STV. The first output enable signal DE1_O may be a clock signal synchronizer) with a falling time of the output enable signal STV.

The first data alignment unit 314 may output the first output enable signal DE1_O and the first modulation data M_DATA1 synchronized with the first output enable signal DE1_O.

The second data alignment unit 324 may read the second image data DATA2 from the second memory 321 on a per-line data basis and may receive a part of the first image data DATA1 transferred from the first data communication unit 313. The second data alignment unit 324 may generate second modulation data DATA2 by rearranging the second image data DATA2 and a part of the first image data DATA1. The rearranged second image data DATA2 and rearranged part of the first image data DATA1 may he applied to their respective corresponding pixels. The second data alignment unit 324 may rearrange line data once whenever two line data are read. For example, the second data alignment unit 324 does not rearrange first line data R14, G15 and B16 of the second image data DATA2. The second data alignment unit 324 may rearrange second line data R24, G25 and B26 of the second image data DATA2 and the blue data B23 transferred from the first data communication unit 313.

The second data alignment unit 324 may rearrange data and outputs the blue data B23 to a (m+1)-th data line Dm+1, red data R24 to a (m+2)-th data line Dm+2, and green data G25 to a (m+3)-th data line.

Second line data of the second modulation data M_DATA2 may include the blue, red and green data B23, R24 and G25 that are part of the first image data DATA1.

The second data alignment unit 324 may generate a second output enable signal DE2_O based on the output enable signal STV. The second output enable signal DE2_O may be a clock signal synchronized with a falling time of the output enable signal STV.

The second data alignment unit 324 may output the second output enable signal DE2_O and the second modulation data M_DATA2 synchronized with the second output enable signal DE2_O. In an exemplary embodiment of the inventive concept, the first and second timing controllers 310 and 320 may perform unidirectional data communication therebetween. However, the inventive concept is not limited thereto. For example, the first and second timing controllers 310 and 320 can perform bi-directional data communication therebetween.

Figure 6:
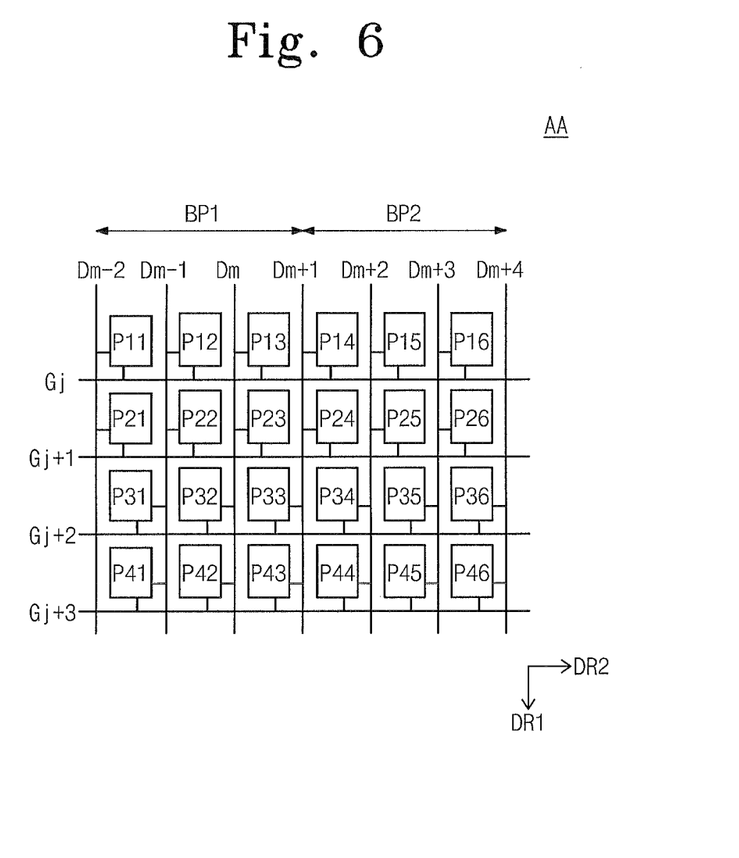
FIG. 6 is an expanded view of a portion AA in FIG. 1 according to an exemplary embodiment of the inventive concept.
Figure 7:
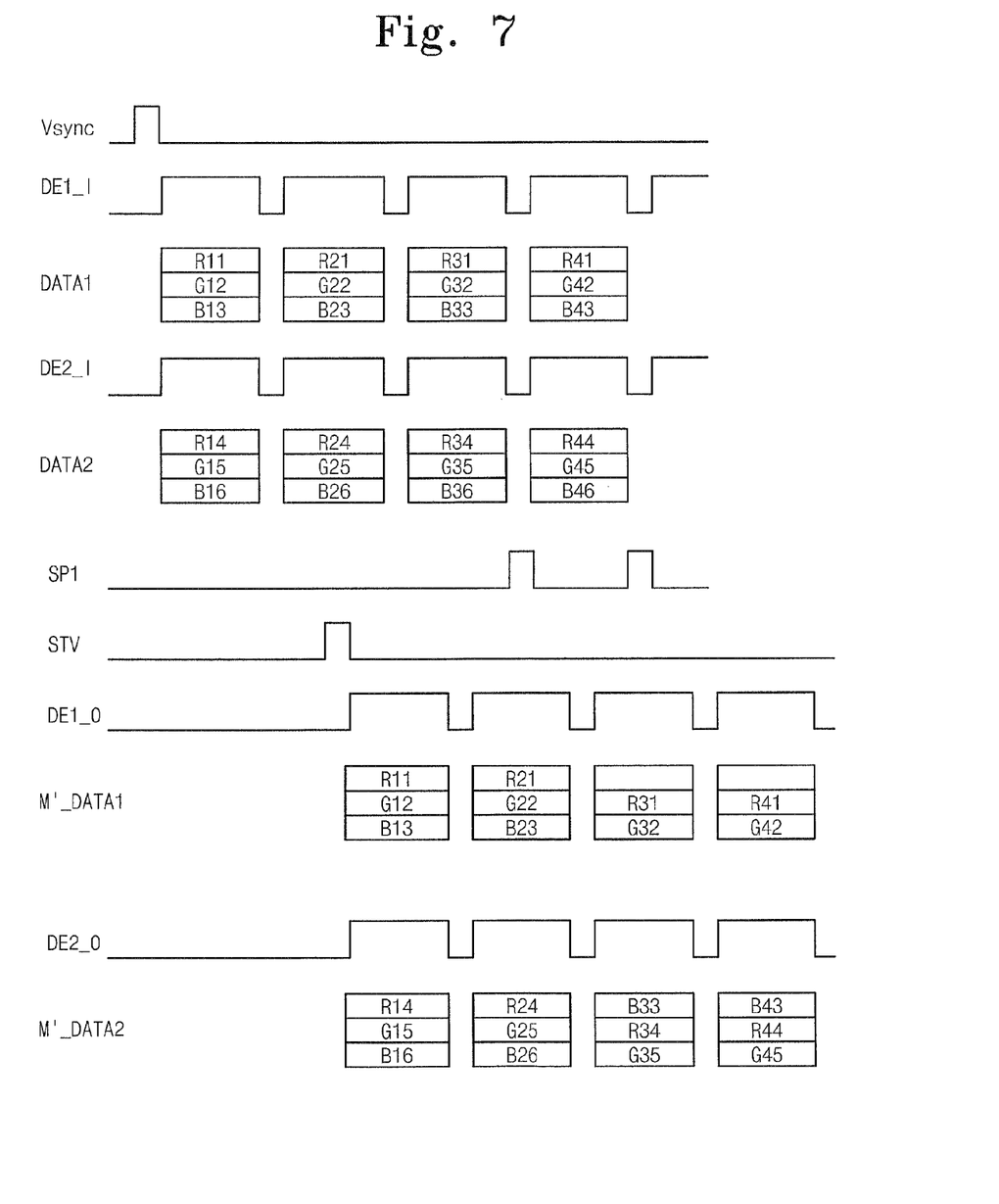
FIG. 7 is a diagram illustrating input and output signals of first and second timing controllers according to an exemplary embodiment of the inventive concept.

FIG. 6 is an expanded view illustrating portion AA in FIG. 1 according to an exemplary embodiment of the inventive concept. FIG. 7 is a diagram illustrating input and output signals of first and second timing controllers according to an exemplary embodiment of the inventive concept.

This embodiment of the inventive concept may be the same or substantially the same as the exemplary embodiment of the inventive concept described above in connection with FIGS. 1 to 5 except for the structure of pixels, data transfer signals, and first and second modulation data.

As illustrated in FIG. 6, pixels in a pixel column may be alternately connected to adjacent data lines positioned at both sides thereof every u pixels (u is a natural number more than 2). As shown in FIG. 6, as an example, pixels in each pixel column are alternately connected to adjacent data lines every two pixels.

Referring to FIG. 6, in a third pixel column including pixels P13 to P43, for example, a first row pixel P13 and a second row pixel P23 may be connected to an m-th data line Dm, and a third row pixel P33 and a fourth row pixel P43 may be connected to a (m+1)-th data line Dm+1.

Referring to FIGS. 4, 6, and 7, a data transfer signal SP1 may have u (u is a natural number more than 2) sequential pulses while 2u line data are continuously received by a first timing controller 310. The data transfer signal SP1 may have u pulses continuously while 2u line data are continuously received by a second timing controller 320.

For example, since pixels are alternately connected adjacent data lines every two pixels, the data transfer signal SP1 may have two sequential pulses whenever four line data are received by the first timing controller 310 or the second timing controller 320. The data transfer signal SP1 does not have a pulse when first line data and second line data are received by the first timing controller 310 or the second timing controller 320. The data transfer signal SP1 may have a pulse when third line data is received by the first timing controller 310 or the second timing controller 320, and the data transfer signal SP1 may have a pulse when fourth line data is received by the first timing controller 310 or the second timing controller 320.

A timing when the data transfer signal SP1 is pulsed may be determined according to a timing when data loss occurs. Thus, when data lines connected with pixels in FIG. 6 are changed, a timing when the data transfer signal SP1 is pulsed may vary.

A first data communication unit 313 and a second data communication unit 323 may perform data communication therebetween based on the data transfer signal SP1. The first data communication unit 313 may transfer blue data B33 of third line data and blue data B43 of fourth line data to the second data communication unit 323.

A first data alignment unit 314 may rearrange line data twice whenever four line data are read. For example, the first data alignment unit 314 does not rearrange first line data R11, G12, and B13 and second line data R21, G22, and B23. The first data alignment unit 314 may generate first modulation data M'_DATA1 by rearranging third line data R31, G32, and B33 and fourth line data R41, G42, and B43 of the first image data DATA1.

A second data alignment unit 324 may rearrange line data twice whenever four line data are read. For example, the second data alignment unit 324 does not rearrange first line data R14, G15, and B16 and second line data R24, G25, and B26. The second data alignment unit 324 may rearrange third line data R34, G35, and B36 of the second image data DATA2 and the blue data B33 transferred from the first data communication unit 313. The second data alignment unit 324 may rearrange fourth line data R44, G45, and B46 of the second image data DATA2 and the blue data B43 transferred from the first data communication unit 313.

Figure 8:
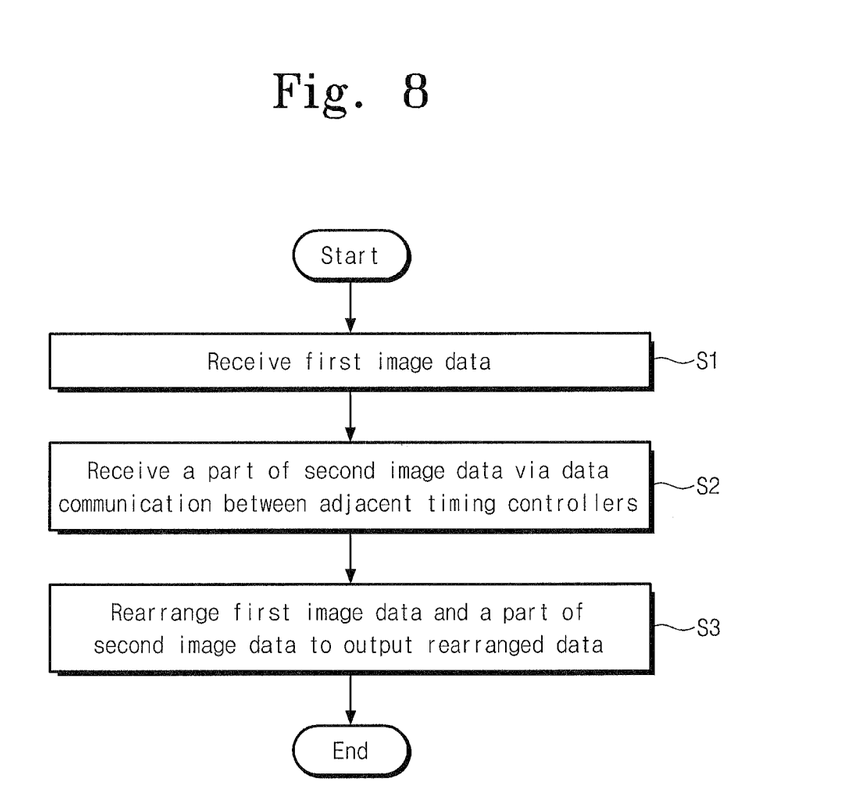
FIG. 8 is a flow chart illustrating a method of driving a display device according to an exemplary embodiment of the inventive concept.

FIG. 8 is a flow chart illustrating a method of driving a display device according to an exemplary embodiment of the inventive concept.

Referring to FIGS. 1 and 8, in operation S1, a second timing controller 320 may receive second image data DATA2. The second image data DATA2 may be image data corresponding to a second block BP2. Likewise, a first timing controller 310 may receive first image data DATA1. The first image data DATA1 may be image data corresponding to a first block BP1.

Each of the first and second blocks BP1 and BP2 may include pixels which are alternately connected to adjacent data lines every pixel.

In operation S2, a part of the first image data DATA1 may be transmitted through data communication between timing controllers. For example, the second timing controller 320 may receive a part of the first image data through data communication between the first and second timing controllers 310 and 320. A part of the first image data DATA1 may be image data corresponding to pixels connected with a (m+1)-th data line.

In operation S3, the second timing controller 320 may rearrange the second image data and a part of the first image data DATA1 and may output rearranged data.

The first and second timing controllers 310 and 320 may perform unidirectional or bi-directional data communication therebetween. The first and second timing controllers 310 and 320 may perform serial or parallel communication therebetween.

A method of driving a display device according to an exemplary embodiment of the inventive concept may drive a display device without data loss even where pixels are alternately disposed, by performing data communication between adjacent timing controllers.

While the inventive concept has been shown and described with reference to exemplary embodiments thereof, it will be apparent to those of ordinary skill in the art that various changes in form and detail may be made thereto without departing from the spirit and scope of the inventive concept as Defined by the following claims.

What is claimed is:

1. A display device comprising:
    a display panel, the display panel comprising:
        m data lines extending in a first direction, wherein m is a natural number;
        gate lines extending in a second direction; and a plurality of pixels respectively disposed in regions defined by the m data lines and the gate lines, wherein at least one first pixel disposed along the first direction among the plurality of pixels is alternately connected with adjacent data lines adjacent to each other in the second direction among the m data lines every u pixels, wherein u is a natural number, wherein a first block and a second block are defined at the display panel, wherein the second block is adjacent to the first block, with a k-th data line positioned between the first block and the second block, wherein k is a natural number more than 1 and less than m;
    a first timing controller configured to receive first image data corresponding to the first block; and a second timing controller configured to receive second image data corresponding to the second block, wherein at least one of a part of the first image data or a part of the second image data is transferred to the first timing controller or the second timing controller, and wherein application of the part of the first image data received by the first timing controller to the at least one first pixel in the first block of the plurality of pixels alternately connected to the adjacent data lines is a providing of analog data voltages controlled by the second timing controller.

2. The display device of claim 1, wherein the second timing controller comprises:
a memory configured to store the second image data on a per-line data basis;
a transfer signal generating unit configured to generate a data transfer signal, wherein the data transfer signal is pulsed once whenever at least two line data are stored;
a data communication unit configured to perform data communication with the first timing controller based on the data transfer signal; and
a data alignment unit configured to rearrange the line data and a part of the first image data received from the first timing controller.

3. The display device of claim 2, wherein the part or the first image data corresponds to at least one second pixel of the plurality of pixels, wherein the at least one second pixel is included in the first block and is connected with the k-th data line.

4. The display device of claim 1,
wherein the first timing controller and the second timing controller receive the first image data and the second image data, respectively, on a per-line data basis, and
wherein the first timing controller and the second timing controller transmit data u times whenever 2u line data are received.

5. The display device of claim 4, wherein u is 1.

6. The display device of claim 1, wherein u is 1.

7. The display device of claim 1, wherein a part of the first image data and a part of the second image data each include 8 to 12 data bits.

8. The display device of claim 1, wherein the first timing controller and the second timing controller are configured to perform unidirectional or bi-directional data communication therebetween.

9. The display device of claim 1, wherein the first timing controller and the second timing controller are configured to perform serial or parallel communication therebetween.

10. The display device of claim 1, further comprising: a distributor configured to receive the first and second image data from an external device and configured to provide the first image data to the first timing controller and the second image data to the second timing controller, the distributor being disposed substantially at a center of the back of the display panel.

11. The display device of claim 1, further comprising: third to eighth timing controllers disposed on the back of the display panel along two opposite sides of the display panel substantially in the second direction.

12. The display device of claim 11, wherein the first to fourth timing controllers are spaced apart from each other and are disposed along an upper side of the display panel, and the fifth to eighth timing controllers are spaced apart from each other and are disposed along a lower side of the display panel.

13. A method of driving a display device comprising:
providing first image data for pixels in a first block to a first timing controller;
providing second image data for pixels in a second block adjacent to the first block to a second timing controller adjacent the first timing controller;
receiving by the second timing controller a part of first image data through data communication between the adjacent first and second timing controllers; and
rearranging the second image data and the part of the first image data and outputting rearranged data,
wherein application of the part of the first image data received by the first timing controller to a pixel in a column of the first block adjacent a pixel in a column of the second block is a providing of analog data voltages controlled by the second timing controller.

14. The driving method of claim 13,
wherein the second image data corresponds to a second block, the first image data corresponds to a first block adjacent to the second block, with a k-th data line positioned between the first block and the second block,
wherein k is a natural number, and wherein each of the first and second blocks includes a plurality of pixels alternately connected with adjacent data lines every one or more pixels.

15. The driving method of claim 14, wherein the part of the first image data corresponds to at least first pixel connected with the k-th data line among the plurality of pixels.

16. The driving method of claim 14, wherein the data communication includes unidirectional data communication or bi-directional data communication.

17. The driving method of claim 14, wherein the data communication includes serial or parallel data communication.

18. A display device comprising:
a display panel, the display panel comprising:
m data lines extending in a first direction, wherein m is a natural number;
gate lines extending in a second direction; and
a plurality of pixels respectively disposed in regions defined by the m data lines and the gate lines, wherein at least one first pixel disposed along the first direction among the plurality of pixels is alternately connected with adjacent data lines adjacent to each other in the second direction among the m data lines every u pixels, wherein u is a natural number, wherein a first block and a second block are defined at the display panel, wherein the second block is adjacent to the first block, with a k-th data line positioned between the first block and the second block, wherein k is a natural number more than 1 and less than m;
a first timing controller configured to receive first image data corresponding to the first block and connected with the first k-th data lines; and
a second timing controller configured to receive second image data corresponding to the second block and connected with the (k+1)-th to m-th data lines,
wherein the first timing controller transfers a part of the first image data corresponding to at least one pixel, disposed first block and connected with the (k+1)-th data line, to the second timing controller, and
wherein the part of the first image data received by the first timing controller to a pixel in a column of the first block adjacent a pixel in a column of the second block is a providing of analog data voltages controlled by the second timing controller.

19. The display device of claim 18, wherein the second timing controller comprises:
  memory configured to store the second image data on a per-line data basis;
  a transfer signal generating unit configured to generate a data transfer signal, wherein the data transfer signal is pulsed once whenever at least two line data are stored;
  a data communication unit configured to perform data communication with the first timing controller based on the data transfer signal; and
  a data alignment unit configured to rearrange the line data and a part of the first image data received from the first timing controller.

20. A display device comprising:
  a display panel comprising a first block and a second block adjacent to the first block, with a data line positioned between the first block and the second block, wherein the first block includes a first column of pixels, and the second block includes a second column of pixels, and wherein the first and second columns of pixels are alternately connected to the data line;
  a first timing controller configured to receive first image data corresponding to the first block; and
  a second timing controller configured to receive second image data corresponding to the second block,
  wherein the first timing controller is configured to transfer at least part of the first image data to the second timing controller, and
  wherein application of the at least part of the first image data received by the first timing controller to a pixel in the first block alternately connected to the data line is a providing of analog data voltages controlled by the second timing controller.

* * * * *